United States Patent
Baudou et al.

(10) Patent No.: US 6,493,147 B1
(45) Date of Patent: Dec. 10, 2002

(54) OPTRONIC DEVICE EQUIPPED WITH A FOCUSING MIRROR FOR VISOR DISPLAY

(75) Inventors: Joël Baudou, St Medard en Jalles (FR); Ludovic Pennetier, St Andre de Cubzac (FR); Laurent Potin, Bordeaux (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/926,452

(22) PCT Filed: May 5, 2000

(86) PCT No.: PCT/FR00/01231

§ 371 (c)(1),
(2), (4) Date: Nov. 6, 2001

(87) PCT Pub. No.: WO00/68727

PCT Pub. Date: Nov. 16, 2000

(30) Foreign Application Priority Data

May 7, 1999 (FR) .............................. 99 05867

(51) Int. Cl.[7] ................................ G02B 27/14
(52) U.S. Cl. ........................ 359/630; 359/633
(58) Field of Search ................. 359/630, 631, 359/632, 633, 637, 639, 640, 730, 819; 345/7, 8, 9

(56) References Cited

U.S. PATENT DOCUMENTS

| | | | |
|---|---|---|---|
| 3,787,109 A | 1/1974 | Vizenor | 359/631 |
| 5,334,991 A | 8/1994 | Wells et al. | 345/8 |
| 5,467,480 A | 11/1995 | Baudou et al. | 2/65 |
| 5,612,708 A * | 3/1997 | Ansley et al. | 340/980 |
| 5,623,730 A | 4/1997 | Baudou et al. | 2/6.2 |
| 5,629,807 A * | 5/1997 | Hall | 359/630 |
| 5,742,937 A | 4/1998 | Baudou et al. | 2/6.3 |
| 6,014,769 A | 1/2000 | Baudou et al. | 2/6.1 |
| 6,055,109 A * | 4/2000 | Hur | 359/630 |
| 6,262,849 B1 | 7/2001 | Potin et al. | 359/631 |
| 6,304,386 B1 | 10/2001 | Potin | 359/630 |
| 6,342,872 B1 | 1/2002 | Potin et al. | 345/8 |
| 6,356,393 B1 | 3/2002 | Potin et al. | |

FOREIGN PATENT DOCUMENTS

| | | |
|---|---|---|
| DE | 42 04 511 | 8/1993 |
| WO | WO 98/10323 | 3/1998 |
| WO | WO 99/21044 | 4/1999 |
| WO | WO 00/68726 | 11/2000 |

\* cited by examiner

Primary Examiner—Georgia Epps
Assistant Examiner—Saeed Seyrafi
(74) Attorney, Agent, or Firm—Oblon, Spivak, McClelland, Maier & Neustadt, P.C.

(57) ABSTRACT

An optronic device fitted with a focusing mirror for projection on a visor. A plane mirror is placed between the last active component of the optronic device and the visor. The mirror is attached to a reinforcement of the device by an elastomeric seal that presses the mirror against screws screwed into the reinforcement. The ends of each pair of screws form axes about which it is possible to pivot the mirror. An identical action on each of the screws makes it possible to move the mirror in translation. Adjusting the mirror makes it possible to alter the position of the visor seen by an optical module of the optronic device, and therefore to focus the image on the visor so that it is as sharp as possible. This corrects placement errors of the visor and its curvature defects.

7 Claims, 2 Drawing Sheets

OPTRONIC DEVICE EQUIPPED WITH A FOCUSING MIRROR FOR VISOR DISPLAY

FIELD OF THE INVENTION

The subject of the present invention is an optronic device fitted with a focusing mirror for projection on a visor. The field of the invention is the piloting of craft for which the pilot needs to be presented with information without it distracting him from his piloting, for example a sighting system with projection on the visor of the pilot helmet. The aim of the invention is to make sure that an image generator and a projection visor of an optronic device are correctly positioned one with respect to the other. That is to say that the image emitted by the image generator is correctly displayed on the projection visor. Another objective is to increase the manufacturing tolerances of the structure of the optronic device.

DISCUSSION OF THE BACKGROUND

For reasons of weight, ergonomics and safety, a large proportion of current systems project onto a visor. Part of the visor acts as a semireflecting mirror for the optic of the visor. The shape of this visor is generally spherical or axisymmetric, therefore it functions in the same way as the power components in the optical combination of the visor. Since the visor is exposed, getting scratched and dirty, for lifetime considerations, the visor must be disconnectable. The visor is an optical component with a large surface area (angular coverage of the eye) and small thickness (weight) and made of plastic (safety and weight), it is therefore a fragile component which is easily deformed, so it is mounted onto a plastic or composite support.

The complete optical system therefore comprises an image generator which generates an image from a source or a purely synthetic image, a relay optic responsible for transmitting the light ray from this generator to the visor, which superimposes the image with the natural scenery observed directly through the visor by the user's eyes.

The relay optic deforms the image from the image generator according to a distortion the opposite of that introduced by the inclined visor. The combination of the visor relay optic assembly then provides a distortion-free image from the image generator.

The use of high-precision mechanical and optical parts for producing the relay optic makes it possible to obtain acceptable optical performance. With regard to the visor, the problem is more difficult given its removability and its ability to deform depending on external conditions, in particular temperature. On assembly, the usual approach would consist, after putting the visor in place, in recentering the relay optic so that the image obtained on the projection visor was correct.

Another solution consists in moving the visor until it is in a position providing a correct image. This solution is acceptable for a monocular visor having only a single optical center. This is because, since the visor has a protective role to play, it must be made in one piece. If a binocular visor, therefore having two optical centers is considered, it is highly likely that once the right optical center is in place, the left optical center will not have an ideal position, hence distortions in the final image. The binocular solution is the most widespread, since at present it is this which provides the largest angular coverage, and also the best image.

The use of a binocular visor therefore requires the independent adjustment of the right and left relay optic. In this case, these adjustments are essential since the binocular superposition requirements are very strict. The tolerance of position of the visor with respect to the projection optic is, in this case, about 0.05 mm. Adjustment of these relay optic blocks involves a heavy adjusting mechanism given the required accuracy and precision constraints. This excess weight is detrimental to the safety of the wearer.

Furthermore, a difference in the position of the relay optic with respect to its theoretical position could introduce distortions due to edge effects. This is because the path of the light rays would no longer be that of the optical axis. Finally, this solution is difficult to use within the scope of a light amplification system, since in this case, the image acquisition objective lens is integral with the relay optic. All movements of this relay optic would therefore cause movement of the image acquisition objective lens and the device would then no longer face the correct direction.

SUMMARY OF THE INVENTION

The invention solves these problems by replacing the mechanical adjustment system, positioning one optical component with respect to another, with an optical adjustment system. That is to say the optical function of an optical component is positioned with respect to another, in the place expected by this other component. Mechanically, the components keep their position, it is the optical function which moves. In the invention, the movements of the optical function are provided by a plane mirror. This mirror makes sure that the relay optic sees the visor in its theoretical position, the position that the visor would have if the device was perfect. The position of this mirror can be adjusted so that the relay optic functions and the visor functions can be moved one with respect to the other.

The subject of the invention is therefore an optronic device, attached to a helmet, comprising an image source 104, a relay optic device 105, a semireflecting projection visor 108, these three components being held together by a rigid mechanical reinforcement 301 and, between the relay optic and the visor, on the optical path of rays 109 from the image source, a plane folding mirror 106, the position of which can be adjusted with respect to the reinforcement 301, characterized in that the folding mirror 106 is attached to a rigid support 304, itself connected to the mechanical reinforcement 301 by an elastic seal 307 and in that it is held under pressure via its support 304 on adjustment screws screwed into the reinforcement, these screws enabling the mirror to pivot about the axes passing through the end of two screws.

BRIEF DESCRIPTION OF THE DRAWING

The invention will be better understood on reading the following description and on examining the accompanying figures. The latter are only given by way of indication and are in no way limiting to the invention. The figures show.

DESCRIPTION OF PREFERRED EMBODIMENT

Figure 1:
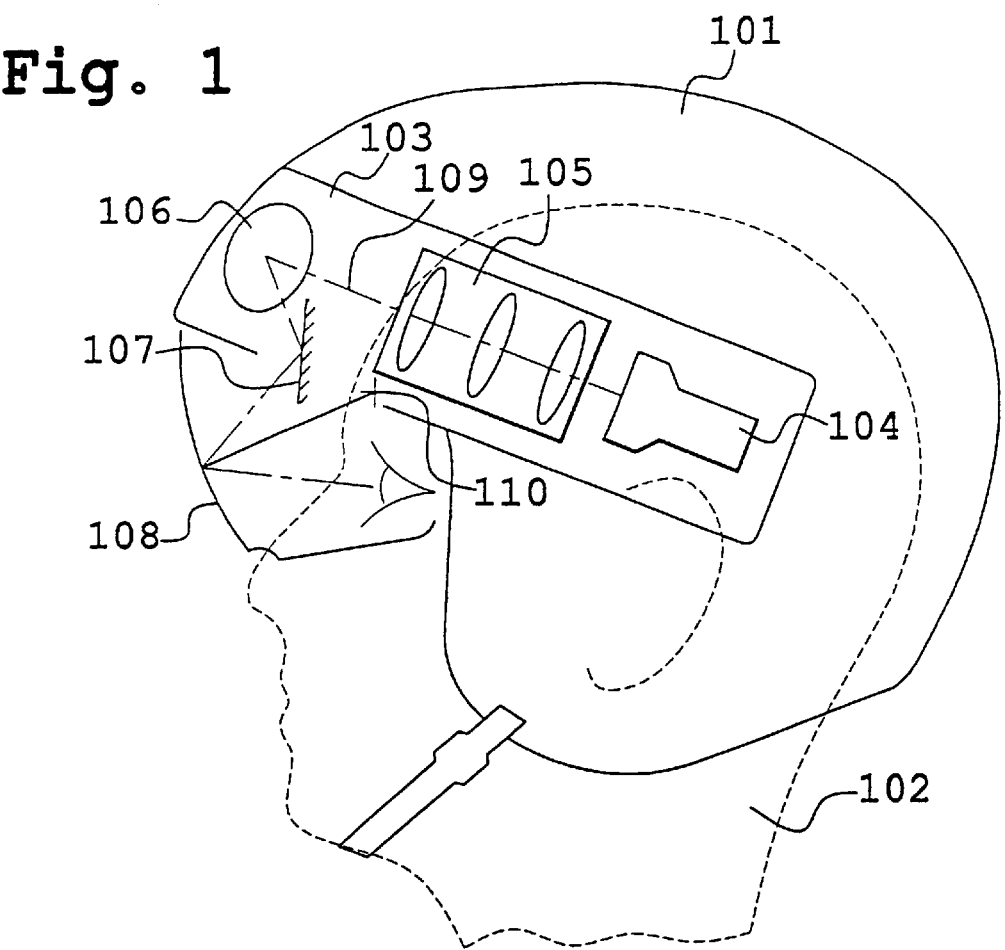
FIG. 1: an illustration of an optronic device according to the invention, in place on the head of a pilot.

FIG. 1 shows a helmet 101 worn by a pilot 102. An optronic device 103 is attached to the helmet 101. The device 103 comprises an image generator 104 which projects a light beam through a relay optic device 105. On exiting the device 105 the light beam is reflected on two folding mirrors 106 and 107 before reaching the projection visor 108. When the device 103 is in place on the helmet 101, the visor 108 is opposite the eyes of the pilot 102. The visor has undergone a semireflecting treatment which makes it possible for it to act both as a projection visor and as a protection visor.

The generator 104 may be either a camera, or a sensor, or a cable of the fiber optic type conveying an image to the device 103. Thus the images are either acquired images, or synthetic images intended to provide information of the signal type to the helmet wearer. The role of the relay device 105 is to predistort the image from- the generator 104. This is because this image will be displayed on the visor 108 which, because of its shape, is an active optical component. The device 105 will therefore provide the image from the generator 104 with deformations which are the reverse of those introduced by the visor 108, which will enable the wearer 102 of the helmet 101 to see a coherent image. The mirrors 106 and 107 enable a light ray 109 coming from the generator 104 via the device 105 to reach the eye of the wearer 102 via the visor 108. These mirrors 106 and 107 are therefore optically inactive. That is to say, they do not distort the image, they act only to bring the image to where it is required to be projected. The arrangement of the mirror 106 can be adjusted. When the mirror 106 is moved, the position of the visor 108 is altered such that it is seen by the device 105. This makes it possible to correct faults in position or shape of the visor 108. There is no active optical component between the mirror 106 and the visor 108. This is one of the conditions which means that the movement of the mirror 106 does not lead to additional distortions in the image from the generator 104. The position of the visor 108 is characterized by the position of a center 110 of curvature.

Figure 2:
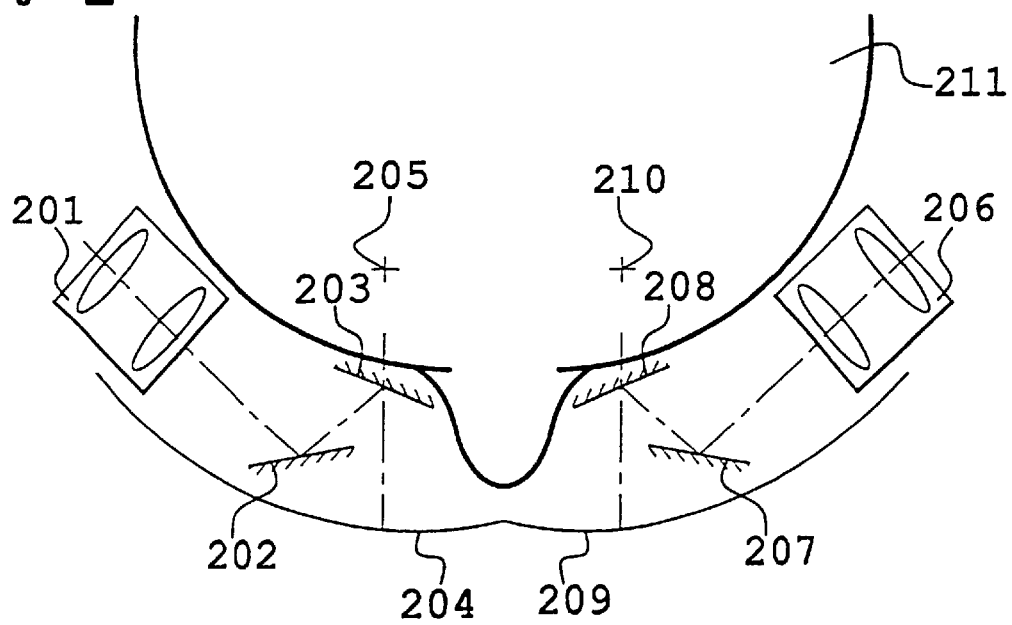
FIG. 2: a top view of an optronic device according to the invention in place on the head of a pilot.

FIG. 2 shows a device according to the invention mounted on a helmet placed on the head 211 of a pilot. In its right part, the device according to the invention comprises a relay optic device 201. The light beam from the device 201 is reflected on a plane mirror 202 then on a plane mirror 203 before reaching a part 204 of a visor of the device according to the invention. The part visor 204 has a center of curvature 205. The position of the mirror 202 can be adjusted. Adjusting the mirror 202 enables the position of the center of curvature 205, seen from the device 201, to be varied. In its left part, the device according to the invention comprises components 206 to 210 identical to the components 201 to 205.

By means of the mirrors 202 and 207, it is possible to adjust separately the positions of the centers of curvature 205 and 210 of the visor parts 202 and 209. Thus a fault in the physical positioning of the visor together with a manufacturing fault of the visor is corrected. Because of its manufacturing equipment, its conditions of storage and use, the relative positions of the visor parts 204 and 209, each consisting of a spherical part, may vary from one visor to another. The device according to the invention makes it possible to overcome these variations.

Figure 3:
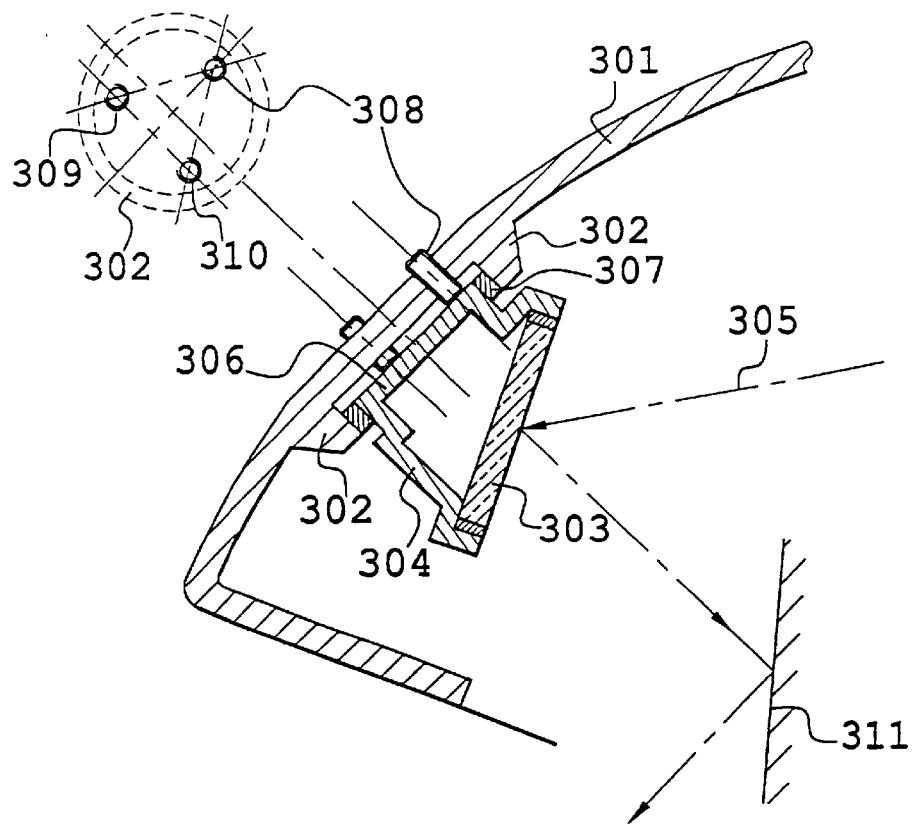
FIG. 3: a sectional view of the plane mirror and of its adjustment device according to the invention.

FIG. 3 shows part of a mechanical reinforcement 301. Seen as a whole, the reinforcement 301 is a box which contains the whole of the device according to the invention. This box has a U-shape which is fitted around the helmet to which it is attached. A circular bulge 302 is provided in the reinforcement 301. This bulge 302 is located at the site where it is desired to position an adjustable plane mirror 303. The bulge 302 therefore has a crater shape with a flat bottom.

The mirror 303 is attached to a support 304. The reflecting face of the mirror 303 faces toward the inside of the reinforcement 301, facing light rays 305 from the relay optic device (not shown). The support 304 comprises a circular flat bottom 306 whose dimensions make it possible to insert it in the bulge 302. Once the bottom 306 of the support 304 is inserted into the bulge, there is enough space between the walls of the bulge and the walls of the bottom 306 for a seal 307. Once the support 304 is in place, there is a clearance of a few tenths of a millimeter between the bottom 306 of the support 304 and the bottom of the bulge 302.

FIG. 3 shows that the bottom of the bulge 302 is drilled with three screw threads 308 to 310. A screw, whose length is slightly greater than the thickness of the reinforcement 301, which is also the thickness of the bottom of the bulge 302, is inserted in each of these screw threads. The head of these screws is located outside the reinforcement 301. These screws are then screwed until coming into contact with the bottom of the support 304. Then these screws are again screwed so that they penetrate inside the reinforcement 301 by a tenth of a millimeter. The mirror 303 is then in its theoretical position. That is to say, if the visor is perfect, there is no further adjustment to be carried out so that the image perceived by the helmet wearer is correct.

It is the seal 307 which provides the elastic connection between the support 304 and the reinforcement 301. It is provided using a low-shrinkage adhesive having elastic properties. Thus when the support 304 and therefore the mirror 303, is in its theoretical position, the seal 307 returns the support 304, therefore the mirror 303, toward the screws described above. The mirror 303 is therefore pressed, via its support 304, against the screws screwed into the screw threads 308 to 310. From this theoretical position, it is possible to screw or unscrew each of the screws. It is thus possible to make the mirror 303 pivot about three axes. One axis formed by the straight line passing through the end of two screws, those corresponding to the screw threads 308 and 309, another axis formed by the straight line passing through the end of two screws, those corresponding to the screw threads 309 and 310, and a final axis formed by the straight line passing through the end of two screws, those corresponding to the screw threads 310 and 308. These three degrees of freedom make it possible to position the mirror 303 such that the device according to the invention fulfills its function.

The mirror is therefore attached to the reinforcement 301 of the device by an elastomeric seal 307 which presses the mirror against the screws screwed into the reinforcement. The ends of each pair of screws form axes about which it is possible to pivot the mirror. An identical action on each of the screws makes it possible to move the mirror in translation. Adjusting this mirror makes it possible to alter the position of the visor seen from an optical module of the optronic device, and therefore to focus the image on the visor so that it is as sharp as possible. This corrects the positioning errors of the visor and its curvature faults.

In an alternative embodiment, the bottom of the bulge 302 contains not three screw threads but four. These four screw threads form a square within the circle described by the bulge 302. In the same way as above, the support 304 is then pressed against the end of the four screws corresponding to each of the screw threads. The use of four screws enables a faster and hence more natural adjustment to be carried out. This is because, with four screws, orthogonal axes are obtained. Although the manipulation of the screws is then more difficult, the convergence toward the correct position of the mirror 303 is faster since humans are used to the orthonormal coordinate system. The manipulation is more difficult since, in order that the adjustment is stable, it is necessary for the ends of the four screws to be coplanar. Once the mirror 303 is correctly adjusted, the light beam 305 from an optical device will be reflected on the mirror 303 then on a mirror 311 before being correctly projected on a visor (not shown).

Figure 4:
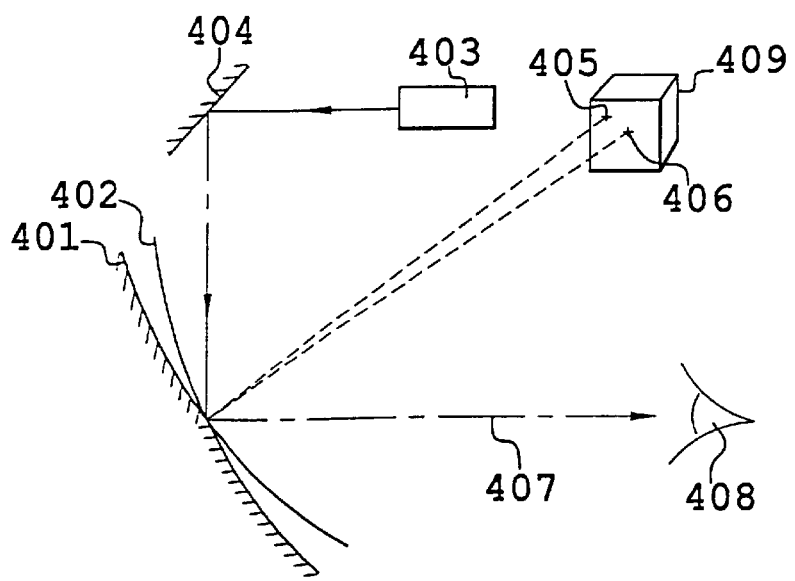
FIG. 4: an illustration of the implementation of the device for adjusting the plane mirror of the optronic device according to the invention.

FIG. 4 shows a physical visor 401. FIG. 4 also shows a visor 402 which is the image of the visor 401 seen by a relay optic device 403 through an adjustable mirror 404. The visor 401 has a center of curvature 405. The visor 402 has a theoretical center of curvature 406. The center of curvature 406 is such that if the visor has its center at this point, an image 407 from the device 403 will be correctly perceived after reflection on the mirror 404 and the visor 402 by an eye 408 of the user of the device according to the invention. The center of curvature 406 is the center of a cube 409 which describes all the possible positions of the center of curvature of the image of the visor 401 through the mirror 404 and seen by the device 403 when the mirror 404 is adjusted. The aim of the operation is therefore for the device 403 to see the visor 401 such that the latter has a center of curvature at the point 406.

What is claimed is:

1. An optronic device, attached to a helmet, comprising an image source, a relay optic device, and a semireflecting projection visor, held together by a rigid mechanical reinforcement and, between the relay optic and the visor, on an optical path of rays from the image source, a plane folding mirror, a position of which is configured to be adjusted with respect to the reinforcement, wherein the folding mirror is attached to a rigid support, the rigid support connected to the mechanical reinforcement by an elastic seal and the folding mirror is held under pressure by the rigid support on adjustment screws screwed into the reinforcement, the screws configured to pivot the mirror to pivot about axes passing through an end of the screws.

2. The device as claimed in claim 1, wherein the reinforcement has a bulge and the rigid support has a flat bottom configured to be inserted in the bulge, the seal being placed between walls of the bulge and walls of the flat bottom.

3. The device as claimed in claim 1, wherein the seal is an elastomeric seal.

4. The device as claimed in claim 2, wherein the bulge has a bottom drilled with screw threads, a bottom of the support abutting against the screws.

5. The device as claimed in claim 1, wherein the rigid support for the folding mirror abuts against three adjustment screws.

6. The device as claimed in claim 1, wherein the rigid support for the folding mirror abuts against four adjustment screws.

7. The device as claimed in claim 5, wherein heads of the adjustment screws are accessible from outside the device.

* * * * *